United States Patent Office 3,065,218
Patented Nov. 20, 1962

3,065,218
POLYMERIZATION OF ISOPRENE IN ALIPHATIC MONOOLEFIN SOLVENT
Charles R. Greene, Rolling Hills, Calif., assignor to Shell Oil Company, a corporation of Delaware
No Drawing. Filed Feb. 5, 1959, Ser. No. 791,264
5 Claims. (Cl. 260—94.2)

This invention relates to improved processes for the polymerization of isoprene. More particularly it relates to improvements in the processes for the polymerization of isoprene whereby the resulting product is all, or very nearly all, the cis 1,4-addition product.

It is now known that isoprene may be polymerized to produce the cis 1,4-addition product. This may be accomplished by any of the so-called "lithium catalyzed processes" which are conducted at temperatures below 120° C. and pressures that are less that 500 p.s.i. Normally, the processes are conducted at ambient pressures and temperatures in the order of 40–85° C. In order to produce polymer having a high cis 1,4-content, the polymerizations are conducted in the absence of various impurities that are harmful to the over-all processes. Such impurities include, for example, moisture, oxygen, oxygen-containing compounds, sulfur, sulfur-containing compounds and the like. The effect of such impurities may be to produce polymer having substantially less of the desired structure or the impurities may react with the catalyst to reduce the polymerization rates or the yield of polymer. Another class of compounds which the workers in the prior art have considered to be harmful are those having active hydrogen atoms, such as acetylenic hydrocarbons and unsaturated hydrocarbons, other than the hydrocarbon to be polymerized. In any case, the better practice was to conduct the polymerizations of isoprene under conditions whereby impurities of the type just mentioned are removed insofar as possible because of processing difficulties that may arise. One such difficulty is that the ultimate product may lack uniformity and this lack of uniformity is of vital importance from the marketing aspects of the polymer.

The present invention is directed particularly to the polymerization of isoprene by lithium catalyzed processes whereby the ultimate product contains a very large proportion of the cis 1,4-addition product. Cis 1,4-polyisoprene is a highly useful synthetic rubber and is particularly useful in the manufacture of automobile and truck tires. However, in order for the cis 1,4-polyisoprene to be useful for this purpose it must not contain too high a proportion of the other possible addition products such as the 1,2-, the trans 1,4- or the 3,4-addition products. If the polymerization of isoprene is conducted in the presence of too many impurities of the type described the ultimate polymer may contain too much of the non-cis-1,4-structures so that a product is obtained that falls outside the useful rubber range. This, in fact, is generally true so that it has been heretofore believed that it is vital that the lithium catalyzed polymerization of isoprene be conducted in the substantial absence of all kind of impurities. Monoolefins were classed with such impurities. The present invention is based on the finding that cis 1,4-polyisoprene may be produced in the presence of certain unsaturated hydrocarbons without adversely affecting the polymerization or the nature of the product, and, in fact, may be so conducted to afford very substantial advantages.

It is an object of this invention to provide improvements in the processes for producing cis 1,4-polyisoprene. Another object of this invention to provide such improvements whereby the isoprene is admixed with amylenes. It is yet another object of this invention to provide such processes whereby a substantial reduction in over-all operating costs will always be experienced. Other objects will become apparent as the description of this invention proceeds.

These and other objects are accomplished by the process for polymerizing isoprene in the presence of an organolithium catalyst and of mono-olefins. By this process the isoprene is selectively polymerized and the monoolefins remain unchanged so that they are easily separated from the cis 1,4-polyisoprene product. This feature will be recognized to be a substantial departure from the prior art teachings.

The principal advantage afforded by the present invention is that isoprene may be polymerized to yield a polymer having a high cis 1,4-content without subjecting the isoprene containing $C_5$ mixture to costly separation procedures. This may be best illustrated by briefly describing what is involved in the production of isoprene. Briefly, isoprene may be produced by dehydrogenating isopentane, tert-amylenes, 3-methyl-butene-1 or mixtures thereof. In fact such processes are used commercially and the prior art on the production of isoprene by the dehydrogenation of $C_5$ hydrocarbons of the type described is quite well known and highly developed. From the prior art on the preparation of isoprene from the above-described hydrocarbons it will be observed that the amount of isoprene that is present in the reaction product is rather low, that is in the order of about 40% by weight. Sometimes this amount can be increased by the adoption of careful production methods or by various improvements in the dehydrogenation processes but in general 40% may be taken as a representative figure although in actual practice it can be considerably less than that. This means that there remains in the reaction product from the dehydrogenation processes something in the order of about 60%, or more, of other $C_5$ olefins which were separated almost entirely before the isoprene was considered sufficiently pure for the production of cis 1,4-polyisoprene. The separation of the olefins is time consuming and requires capital expenditures of several million dollars. An idea of the complexity of such apparatus may be had from an examination of the prior art.

The present invention is based on the surprising finding that methyl butenes, tert-amylenes and other mono-olefins will not copolymerize with isoprene when the polymerization is conducted in the presence of the organo-lithium catalysts, while, at the same time, the isoprene is polymerized to a high content of the cis 1,4-addition product and will not adversely affect the polymerization or the nature of the product.

The isoprene that is subjected to the polymerization is, in essence, a crude mixture obtained from the dehydrogenation of $C_5$ hydrocarbons. The crude material may actually be a mixture of isoprene, isopentane, tert-amylenes and 3-methyl-butene-1. The last three components would normally be present in a large amount, usually in excess of 50%, by weight, of the total. The actual percentage of each of the $C_5$ components will vary a great deal depending on the dehydrogenation processes but the significant feature of the present invention is that it is immaterial how much of the pentenes are contained in the mixture as they will not polymerize or copolymerize in the presence of the instant catalysts but rather only the isoprene will polymerize. The $C_5$ hydrocarbons obtained from the dehydrogenation usually accounts for 100% of the crude mixture but it is possible, depending on the processes used for the dehydrogenation, that small, or trace amounts of foreign substances may find their way into the crude mixture. One such impurity may be, for example, moisture. If it is not present in too great a quantity, then it will not adversely effect the present inventive processes. If it is desired to remove the water, then the mixture may simply be passed through a tower containing a conventional dessicant. Other impurities that may be present include sulfur-containing compounds that may, for example, originate with sulfur-containing catalysts. Such impurities may be easily removed by passing the crude hydrocarbon through molecular sieves. Any other impurity may similarly be removed by a simple and selective extraction by suitable purification trains. Still another type of foreign material that may be contained in the crude mixture of $C_5$ hydrocarbons are monoolefins other than those having five carbon atoms as ethylene, propylene, decene-1 and the like. Such olefins may originate because of the high temperatures used during the dehydrogenation of $C_5$ hydrocarbons whereby some reforming, degradation or dimerization may take place. A surprising feature of the present invention is that isoprene will not copolymerize with other monoolefins and, of equal significance is that finding that such monoolefins will not adversely effect the formation of the cis 1,4-polyisoprene either in amount or in rate.

Although the treatment of the dehydrogenated $C_5$ stream to remove any undesirable material presents no operational problem, it will be readily appreciated that an advantage is obtained if the $C_5$-fraction, which is used in the present invention, is prepared under conditions that minimizes or eliminates the formation of undesirable materials in the crude hydrocarbon. Thus, it would be the better practice to conduct the dehydrogenation with a sulfur-free dehydrogenation catalyst. Similarly, it would be better to supply the heat required for the dehydrogenation externally rather than injecting superheated steam into the mixed $C_5$ hydrocarbon mixture. In any case, the present inventive polymerizations do not depend upon any particular method for producing the isoprene as long as it is admixed with monoolefins and as it happens $C_5$-monoolefins would be present in large amounts usually in excess of about 50% by weight.

The catalyst which is employed in the present processes may be any of the so-called "lithium-catalyzed" systems. By "lithium-catalyzed" is meant hydrocarbyl lithium compounds. In the most preferred embodiment the catalyst is selected from alkyl lithium compounds wherein the alkyl radical has from 2 to 8 carbon atoms in a straight chain and more preferred are those having from 4 to 6 carbon atoms in a straight chain. Alkyl lithium having up to 12 carbon atoms may be used but they are less preferred at present because they are difficult to prepare in a highly purified form. The preferred alkyl lithiums, such as n-butyl lithium or n-amyl lithium, are readily available through normal commercial channels. For the purposes of this invention, it will be understood that when reference is made to the alkyl lithium catalysts, polymerized forms thereof are also included. This is because some of the alkyl lithiums are found to exist in forms other than the monomer. For example, the n-butyl lithium catalyst may actually be active as the hexamer in benzene and other solvents.

As previously indicated the polymer prepared by the processes of this invention is a useful synthetic rubber. Such polymers, however, require a sufficiently high molecular weight and also a sufficiently high proportion of the cis 1,4-addition product. It is convenient to express the molecular weight in terms of the intrinsic viscosity of the polymer and for the purposes of this description the molecular weights will hereafter be defined by the intrinsic viscosity measured in deciliters per gram in toluene at 25° C. In considering the useful molecular weight ranges it is found that an intrinsic viscosity of about 2 to 12 falls within the useful synthetic rubber range. The cis 1,4-content of the polyisoprene is determined, for the purposes of this invention, by infrared analysis.

An important consideration in obtaining a polymer within the useful rubber range is the quantity of the catalyst which is employed. As a generalization it may be stated that higher quantities of catalyst will give lower intrinsic viscosities. It follows that the lower catalyst concentration will produce products having higher molecular weights, but this is limited by the finding that a critical minimum of catalyst is reached at about .03 millimole (mmole) per mole of the isoprene, and lesser quantities will not produce any substantial increase either in the intrinsic viscosity or in the quantity of the cis 1,4 configuration. In the preferred embodiment the alkyl lithium is employed in an amount ranging from about .04 to about 1.0 mmole per mole of the isoprene but this range may be varied depending upon other variables which are to be considered hereinafter and may range as high as 1.5 mmole of catalyst per mole of diene.

Another important consideration in obtaining the desired products is the temperature at which the polymerization is conducted. In general, temperatures which range from −20° C. to about 100° C. may be employed but operation at the extremes of this temperature range will produce considerably less stereospecifity and/or unsuitable molecular weights. In the preferred embodiment temperatures ranging from about 25° C. to 85° C. are found to produce the highest yields of the cis 1,4-polymer. In a suggested procedure the mixed feed may be first heated to about 40° C. after which the catalyst is added and shortly thereafter the temperature is reduced to about 20–30° C. and maintained within this temperature range for a short period of time. Thereafter the temperature will rise due to an exotherm and the polymerization is then maintained at the desired polymerization temperature. The initial heating of the diene in the solvent in the presence of the catalyst has the advantage that a longer induction period is avoided.

The processes of this invention are advantageously conducted in a closed system, thereby avoiding loss of monomer by evaporation. Also a closed system excludes air and moisture from the system. As a convenient procedure the reaction is conducted at the pressure created by the system, i.e. autogenic pressure. If desired, however, higher or power pressures may be employed. The time required for the reaction to be completed will vary depending on the variables mentioned above, with temperatures being the more important consideration. At higher temperatures the reaction time is less but, as indicated above, the product is not as desirable. At the preferred temperature of 25–85° C., 10 minutes to 60 hours may be required. At higher temperatures the time will be less and at lower temperatures the time required will be substantially more.

The polymerization is always conducted in the liquid phase. The diluent may be only the mono-olefins and hydrocarbon contained in the mixed feed. If desired added isopentane may be present but generally none of the latter is required. As the polymerization proceeds, the reaction mixture becomes increasingly viscous as the polymer forms and remains in solution until the polymerization is terminated by destroying the catalyst or until the active catalyst is consumed. The latter procedure is preferred as it tends to produce more uniform polymer, particularly in batch operations. If the former procedure is adopted the polymerization may be terminated by adding to the reaction mixture a coagulating agent as isopropanol, acetone or the like, whereupon the polymer coagulates as a rubber crumb. Thereafter, the crumb may be separated by any conventional operation as filtering. The unreacted $C_5$ hydrocarbon may be recovered and returned to the dehydrgeneration unit.

The processes of this invention are suitable for batch, intermittent or continuous operations. Continuous operations by the present processes are efficient and capable of producing large amounts of uniform product within relatively short times.

The invention is described in greater detail in the following examples.

*Example I*

In a preliminary experiment a hydrogenated isoprene sample containing 96.9% isoprene is polymerized in the presence of 78%, by weight, of pentene-1. The mixture of isoprene and pentene-1 is heated to about 55° C. after which catalyst is added. The catalyst for this reaction is 0.24 part of n-butyl lithium per hundred parts of monomer. After the catalyst is added the temperature is maintained at about 55° C. for 360 minutes. The polymerization is conducted in a pressure vessel equipped with an agitator, thermometer and cooling jacket. The polymerization is terminated upon the addition of several ccs. of isopropyl alcohol whereupon a polymer crumb is coagulated and recovered, and by infrared analysis, is found to contain 90% of the cis 1,4-addition product and 4 and 6%, respectively, of the trans 1,4- and 3,4-addition products. No polymer of pentene-1 or copolymer is observed. The recovered polymer has an I.V. of 3.67 and the conversion is 88 mole percent.

*Example II*

In another preliminary experiment the procedures of Example I are repeated except the isoprene feed contains 75%, by weight, of piperylene (which is sometimes contained in rather sizeable amount in isoprene prepared by dehydrogenatiion). The polymerization temperature is 45° C. and the catalyst is n-butyl lithium in an amount of .143 part per hundred parts of isoprene. After 600 minutes of polymerization, the recovered polymer contains 93% of cis 1,4-polyisoprene and 7% of 3,4-polyisoprene. No polymer or copolymer of the piperylene is observed. The recovered polymer has an I.V. of 1.64.

*Example III*

The procedure of Example II is repeated except that isoprene is mixed with 35% by weight, of butadiene. The polymerization is conducted in the presence of isopentane as the solvent. In this case a copolymer is obtained from which it is concluded that the present processes are suitable providing butadiene is not contained in the feed.

*Example IV*

Yet another preliminary experiment is conducted following the procedure of Example II wherein the isoprene is admixed with 78.5%, by weight, of mixed amylenes. The polymerizaton is conducted at 45° C. for 600 minutes with n-butyl lithium being present in an amount of 0.032 part per hundred parts of the isoprene. The recovered product is free of amylene polymer or copolymer and contains 94% cis 1,4-addition product and 6% of the 3,4-addition product. It has an I.V. of 5.28.

*Example V*

The procedure of Example IV is repeated except that the mixed amylenes are present in an amount of 76.25% by weight and the isoprene in an amount of 23.75% by weight. The catalyst is present in an amount of .02 part per hundred parts of the isoprene. The polymerization is conducted at 55° C. until there is about an 82 mole percent conversion of the isoprene. The final product has the same cis 1,4- and 3,4-content as that in Example IV. The I.V. is 6.1 and again there is no polymerization of the amylenes.

*Example VI*

The procedure of Example V is repeated except that the mixed amylenes are present in an amount of 72.6% by weight and the cataylst is present in an amount of .01 part per hundred of the isoprene. The I.V. of the recovered polymer is 7.75 at 82% conversion and the cis 1,4-content is 88%, the 3,4-content being 12%. No polymer of the amylenes is observed.

In a large number of additional preliminary experiments it is found that the same results are obtained irrespective of the hydrocarbyl lithium catalyst selected but for the purpose of the experiments recited here, the more preferred species are employed.

*Example VII*

For this experiment crude isoprene obtained during a regular commercial dehydrogenation of a mixture of isopentane and mixed amylenes is used. The crude feed has the following approximate analysis:

| | Percent by weight |
|---|---|
| Isoprene | 24 |
| n-Pentane | 7 |
| 2-methyl-butene-2 | 44 |
| 2-methyl-butene-1 | 23 |

The balance comprises miscellaneous hydrocarbons including piperylene, pentene-2, pentene-1, ethylene, propylene, isopentane, and other hydrocarbons in very small amounts. The polymerization is carried out at 55° C. for 360 minutes using n-butyl lithium as the catalyst in an amount of 0.04 part per hundred parts of isoprene. The recovered polymer contains about 92% cis 1,4-polyisoprene and about 8% of 3,4-polyisoprene. It has an I.V. of 8.6 and is free of copolymer and other polymers.

From the foregoing examples it will be seen that this invention is capable of numerous modifications particularly in regard to the composition of the monomer feed, the polymerization temperatures and pressures, amount of catalyst and the like. Such modifications, however, will be understood to be within the scope of the invention.

I claim as my invention:

1. In a process for polymerizing isoprene in the presence of an alkyl lithium catalyst containing from 2 to 12 carbon atoms at a temperature ranging from −20° C. to about 100° C. to form a normally solid homopolymer of isoprene having a high cis-1,4-content, the improvement which comprises using in the polymerization as source of isoprene an isoprene feed containing in excess of 50% by weight of aliphatic monoolefin containing five carbon atoms per molecule.

2. The process of claim 1 in which the catalyst is alkyl lithium of 2 to 8 carbon atoms.

3. The process of claim 1 in which the catalyst is n-butyl lithium.

4. The process of claim 1 in which the catalyst is amyl lithium.

5. In a process for polymerizing isoprene in the presence of an alkyl lithium catalyst containing from 2 to 12 carbon atoms and wherein the alkyl lithium is present in an amount ranging from 0.03 to 1.5 millimoles per mol of isoprene and at a temperature between −20° C. and about 100° C. to form a normally solid polyisoprene having cis-1,4-content of at least 90%, the improvement which comprises using in the polymerization as a source of isoprene an isoprene feed containing in excess of 50% by weight of aliphatic monoolefin containing five carbon atoms per molecule.

References Cited in the file of this patent

UNITED STATES PATENTS

| 2,264,811 | Rothrock | Dec. 2, 1941 |
| 2,849,432 | Kibler et al. | Aug. 26, 1958 |
| 2,900,430 | Henke et al. | Aug. 18, 1959 |
| 2,913,444 | Diem et al. | Nov. 17, 1959 |

FOREIGN PATENTS

| 339,243 | Great Britain | Dec. 1, 1930 |

OTHER REFERENCES

Chemical Week, Oct. 26, 1957, page 76.